United States Patent
Kothule et al.

(10) Patent No.: US 9,626,419 B2
(45) Date of Patent: Apr. 18, 2017

(54) OPTIMIZING DATA SYNCHRONIZATION BETWEEN MOBILE CLIENTS AND DATABASE SYSTEMS

(71) Applicant: salesforce.com, inc., San Francisco, CA (US)

(72) Inventors: Deepak Kothule, Culver City, CA (US); Bagrat Mazyan, Calabasas, CA (US); Erik Forsberg, Los Angeles, CA (US); Aleksandra Zhulina, Woodland Hills, CA (US); Pierpaolo Bergamo, San Francisco, CA (US)

(73) Assignee: SALESFORCE.COM, INC., San Francisco, CA (US)

( * ) Notice: Subject to any disclaimer, the term of this patent is extended or adjusted under 35 U.S.C. 154(b) by 0 days.

(21) Appl. No.: 14/480,440

(22) Filed: Sep. 8, 2014

(65) Prior Publication Data
US 2014/0379655 A1    Dec. 25, 2014

Related U.S. Application Data

(62) Division of application No. 13/175,728, filed on Jul. 1, 2011, now Pat. No. 8,832,061.

(60) Provisional application No. 61/361,316, filed on Jul. 2, 2010.

(51) Int. Cl.
G06F 17/30    (2006.01)

(52) U.S. Cl.
CPC .. *G06F 17/30581* (2013.01); *G06F 17/30575* (2013.01); *G06F 17/30873* (2013.01)

(58) Field of Classification Search
None
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |

(Continued)

OTHER PUBLICATIONS

U.S. Appl. No. 13/998,890.

(Continued)

*Primary Examiner* — Bai D. Vu
(74) *Attorney, Agent, or Firm* — Dergosits & Noah LLP; Todd A. Noah

(57) ABSTRACT

Mechanisms and methods are provided for optimizing data synchronization between clients and database systems. These mechanisms and methods provide optimizations for synchronization requests, by either breaking a synchronization request into multiple smaller requests, or by executing different code routines for differing client types, or by pre-caching data that a user is anticipated to want at a future point. Such optimization techniques can enable clients with varying capacities (e.g., mobile client vs. full desktop client) to optimally utilize their respective device capabilities.

24 Claims, 8 Drawing Sheets

(56) References Cited

U.S. PATENT DOCUMENTS

| | | | |
|---|---|---|---|
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,606 B1 | 5/2001 | Dujari | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec et al. | |
| 6,324,693 B1 | 11/2001 | Brodersen et al. | |
| 6,336,137 B1 | 1/2002 | Lee et al. | |
| D454,139 S | 3/2002 | Feldcamp et al. | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier | |
| 6,654,032 B1 | 11/2003 | Zhu | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans et al. | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu | |
| 6,768,904 B2 | 7/2004 | Kim | |
| 6,769,048 B2 | 7/2004 | Goldberg et al. | |
| 6,772,229 B1 | 8/2004 | Achacoso et al. | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,062,502 B1 | 6/2006 | Kesler | |
| 7,340,411 B2 | 3/2008 | Cook | |
| 7,356,482 B2 | 4/2008 | Frankland et al. | |
| 7,401,094 B1 | 7/2008 | Kesler | |
| 7,461,057 B2 | 12/2008 | Radestock et al. | |
| 7,620,655 B2 | 11/2009 | Larsson | |
| 7,698,160 B2 | 4/2010 | Beaven et al. | |
| 7,779,475 B2 | 8/2010 | Jakobson et al. | |
| 7,788,269 B2 | 8/2010 | Behnen et al. | |
| 7,851,004 B2 | 12/2010 | Hirao et al. | |
| 8,010,663 B2 | 8/2011 | Firminger et al. | |
| 8,014,943 B2 | 9/2011 | Jakobson | |
| 8,015,495 B2 | 9/2011 | Achacoso et al. | |
| 8,032,297 B2 | 10/2011 | Jakobson | |
| 8,051,186 B2 | 11/2011 | Tian et al. | |
| 8,082,301 B2 | 12/2011 | Ahlgren et al. | |
| 8,095,413 B1 | 1/2012 | Beaven et al. | |
| 8,095,594 B2 | 1/2012 | Beaven et al. | |
| 8,209,308 B2 | 6/2012 | Jakobson et al. | |
| 8,275,836 B2 | 9/2012 | Beaven et al. | |
| 8,484,111 B2 | 7/2013 | Frankland et al. | |
| 8,490,025 B2 | 7/2013 | Jakobson et al. | |
| 8,504,945 B2 | 8/2013 | Jakobson et al. | |
| 8,510,664 B2 | 8/2013 | Rueben et al. | |
| 8,566,301 B2 | 10/2013 | Rueben et al. | |
| 8,635,271 B1* | 1/2014 | Adya et al. | 709/203 |
| 8,646,103 B2 | 2/2014 | Jakobson et al. | |
| 2001/0044791 A1 | 11/2001 | Richter et al. | |
| 2002/0072951 A1 | 6/2002 | Lee et al. | |
| 2002/0082892 A1 | 6/2002 | Raffel | |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0162090 A1 | 10/2002 | Parnell et al. | |
| 2002/0165742 A1 | 11/2002 | Robbins | |
| 2003/0004971 A1 | 1/2003 | Gong | |
| 2003/0018705 A1 | 1/2003 | Chen et al. | |
| 2003/0018830 A1 | 1/2003 | Chen et al. | |
| 2003/0023607 A1 | 1/2003 | Phelan et al. | |
| 2003/0066031 A1 | 4/2003 | Laane et al. | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker et al. | |
| 2003/0084165 A1 | 5/2003 | Kjellberg et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec et al. | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2003/0220966 A1 | 11/2003 | Hepper et al. | |
| 2003/0225797 A1 | 12/2003 | Shields et al. | |
| 2004/0001092 A1 | 1/2004 | Rothwein et al. | |
| 2004/0015981 A1 | 1/2004 | Coker et al. | |
| 2004/0027388 A1 | 2/2004 | Berg et al. | |
| 2004/0070678 A1 | 4/2004 | Toyama et al. | |
| 2004/0128001 A1 | 7/2004 | Levin et al. | |
| 2004/0186860 A1 | 9/2004 | Lee et al. | |
| 2004/0193510 A1 | 9/2004 | Catahan et al. | |
| 2004/0199489 A1 | 10/2004 | Barnes-Leon et al. | |
| 2004/0199536 A1 | 10/2004 | Barnes Leon et al. | |
| 2004/0200896 A1 | 10/2004 | Eckerl | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0021534 A1 | 1/2005 | Cheng | |
| 2005/0050067 A1 | 3/2005 | Sollicito et al. | |
| 2005/0050555 A1 | 3/2005 | Exley et al. | |
| 2005/0091098 A1 | 4/2005 | Brodersen et al. | |
| 2006/0064470 A1 | 3/2006 | Sargent et al. | |
| 2007/0124309 A1 | 5/2007 | Takase et al. | |
| 2008/0168526 A1 | 7/2008 | Robbin et al. | |
| 2009/0063415 A1 | 3/2009 | Chatfield et al. | |
| 2009/0100342 A1 | 4/2009 | Rueben et al. | |
| 2009/0177744 A1 | 7/2009 | Marlow et al. | |
| 2009/0247134 A1 | 10/2009 | Jeide et al. | |
| 2009/0254589 A1* | 10/2009 | Nair et al. | 707/201 |
| 2010/0058321 A1 | 3/2010 | Anderson | |
| 2010/0153189 A1 | 6/2010 | Dudley et al. | |
| 2010/0262619 A1 | 10/2010 | Zargahi et al. | |
| 2010/0287256 A1* | 11/2010 | Neilio | G06Q 10/10 709/217 |
| 2010/0332650 A1 | 12/2010 | Aisen et al. | |
| 2011/0066715 A1* | 3/2011 | Schieder et al. | 709/223 |
| 2011/0197032 A1* | 8/2011 | Patey | G06F 17/3048 711/133 |
| 2012/0016735 A1 | 1/2012 | Park et al. | |
| 2012/0233137 A1 | 9/2012 | Jakobson et al. | |
| 2012/0271908 A1* | 10/2012 | Luna et al. | 709/216 |
| 2013/0218948 A1 | 8/2013 | Jakobson | |

(56) References Cited

U.S. PATENT DOCUMENTS

2013/0218949 A1    8/2013  Jakobson
2013/0218966 A1    8/2013  Jakobson
2014/0032500 A1*   1/2014  Wibbeler .......... G06F 17/30011
                                              707/661

OTHER PUBLICATIONS

U.S. Appl. No. 13/987,075.
U.S. Appl. No. 13/987,074.
U.S. Appl. No. 13/998,065.
U.S. Appl. No. 13/986,744.
U.S. Appl. No. 13/986,251.

* cited by examiner

OPTIMIZING DATA SYNCHRONIZATION BETWEEN MOBILE CLIENTS AND DATABASE SYSTEMS

CROSS-REFERENCES TO RELATED APPLICATIONS

This is a divisional application of U.S. application Ser. No. 13/175,728 entitled Optimizing Data Synchronization Between Mobile Clients And Database Systems, now U.S. Pat. No. 8,832,061, filed Jul. 1, 2011, which claims the benefit under 35 USC §119(e) of U.S. Provisional Application No. 61/361,316, by Kothule et al., entitled "Methods And Systems For Accessing A Business Networking Feed" filed Jul. 2, 2010, the entire contents of which are herein incorporated by reference for all purposes.

The following commonly owned, co-pending United States patents and patent applications, including the present application, are related to each other. Each of the other patents/applications are incorporated by reference herein in its entirety: U.S. patent application Ser. No. 12/945,410 entitled "Enterprise Level Business Information Networking For Changes In A Database" by Lee et al., filed Nov. 12, 2010 (hereinafter Lee); and U.S. patent application Ser. No. 11/757,087 entitled "Method and System for Pushing Data to a Plurality of Devices in an On-Demand Service Environment" by Weissman et al., filed Jun. 1, 2007 (hereinafter Weissman).

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The present invention relates generally to database systems, and more particularly to optimizing data synchronization between mobile clients and database systems.

Many software systems use a client-server distributed model, wherein a client requests execution of certain business operations (e.g., add a sales opportunity, view all feed items followed by a user, view forecast numbers, etc.), which leads to the request being forwarded to a server system, such as a database system, to be fulfilled. Some common client communications with backend systems (e.g., a database server) include: retrieving user data, retrieving other business data, updating data, or deleting data. Often clients interface with various middle-tier components (e.g., application servers, caching servers, business logic servers, transport or communications' layer servers, etc.) that manage client requests, sometimes forwarding the request to the appropriate underlying database or other back-end system.

Client-server systems, like other solutions, are often designed and implemented with respect to the needs of user communities at the time of the implementation. However, as technologies evolve (e.g. mobile clients are able to interact with sales type of data due to increased sophistication of mobile devices), the original solutions may not be reasonable (e.g., maybe too slow or provide too much data for the device to be able to handle) for the new devices and/or may not leverage fully the capabilities of the new developments. Furthermore, the original solutions may not provide custom solutions for different user communities (e.g., mobile users vs. desktop users), based on differing client capacities.

Therefore it is desirable to provide systems and methods that overcome the above and other problems.

BRIEF SUMMARY

In accordance with embodiments, there are provided mechanisms and methods for optimizing data synchronization between various client types and database systems. These mechanisms and methods can enable embodiments to provide optimized and sometimes varying data sets for a synchronization request. Optimizations can include breaking a synchronization request into multiple smaller requests, executing different code routines for differing client types, and/or pre-caching user data in anticipation of a future user need or request.

The optimization techniques can enable clients with varying capacities (e.g., mobile client vs. full desktop client) to optimally utilize their respective device capabilities. For example, a mobile client may not be able to handle large sets of data at once and thus may require important data, often of a smaller result set, to be sent before other data. On the other hand, a desktop client may have capacity to handle larger datasets and therefore would want to receive all data updates at once to have a complete view of their business or other data, thereby fully leveraging its client system's capabilities.

In one aspect, efficiency is achieved by breaking a sync request into multiple separate operations, and retrieving partial results for each operation. For example, a request may be broken down by types of data (e.g., feed items in one request and all other data in a second request). This allows for a first data set (e.g., news feed items) that may need to be updated in more real-time to be retrieved faster (e.g., because it is a smaller data set, or a simpler query, or by not requiring retrieval of the larger complete data set that takes more time to execute) and allowing another data set to be retrieved at a later point in time.

According to one embodiment, a method for improving performance is provided. A synchronization request, associated with a plurality of different types of data stored in a database, is received. A server divides the request into separate operations based on the different types of data. It then obtains separate partial results based on the breaking of the request into separate operations. In one aspect, the partial results are obtained at a plurality of times, where at least one of the partial results is obtained in near real-time for a type of dataset that requires faster response times to be synced with the requesting client. The server sends each partial request to a user at the time the partial result is obtained.

In another aspect, efficiency is achieved by executing different/custom code, sometimes determining a different result set, based on the client type of the requesting client. For example, a mobile client may receive a smaller set of data while a desktop client may retrieve all data updates due to a larger client system capacity (e.g. memory, disk space, CPU performance, etc.), allowing for optimal use of client resources.

According to another embodiment, a method for synchronizing user data based on client type is provided. A client request for synchronizing data updates from a database is received. The client type is determined and a routine is invoked for that client type, to retrieve data from the database to synchronize with the client device. The invoked routine is selected from a plurality of routines based on the client type. Data corresponding to the requested updates is received from the database via the invoked routine and sent to the client.

Also, a method for pre-caching synchronization data can retrieve data objects in advance of the user request for such data objects. The data objects to be retrieved can be determined from the requested feed items in a current user synchronization request. Such data objects can be pre-cached for a user prior to receiving an update request from the user for those data objects. For example, when a user requests updates to one or more feeds, objects associated with the feed items of the feeds, such as opportunity, underlying organization, or submitting user, can be retrieved and pre-cached. In one aspect, the data objects may be retrieved for pre-caching only if they have been modified since the last time a user synced such data from the database system.

According to yet another embodiment, a method for pre-caching synchronization data is provided. A synchronization request for feeds of objects that a user is following is received. Feed items are retrieved from a database system for the request, where the feed items are associated with one or more objects of a database system. The received feed items are then analyzed to identify one or more objects related to the feed items. At least one of the objects identified is retrieved, prior to receiving a synchronization request from a client or user for that object. The retrieved objects are sent to a user-accessible cache for later serving a client request.

While the present invention is described with reference to an embodiment in which techniques for performing searches of feeds in an on-demand enterprise services environment are implemented in a system having an application server providing a front end for an on-demand database service capable of supporting multiple tenants, the present invention is not limited to multi-tenant databases nor deployment on application servers. Embodiments may be practiced using other database architectures, i.e., ORACLE®, DB2® by IBM and the like without departing from the scope of the embodiments claimed.

BRIEF DESCRIPTION OF THE DRAWINGS

In the following drawings like reference numbers are used to refer to like elements. Although the following figures depict various examples of the invention, the invention is not limited to the examples depicted in the figures.

FIG. 8 is a flowchart of an embodiment of steps of optimizing data synchronization by pre-caching data that a client may later be interested in.

DEFINITIONS

Figure 1:
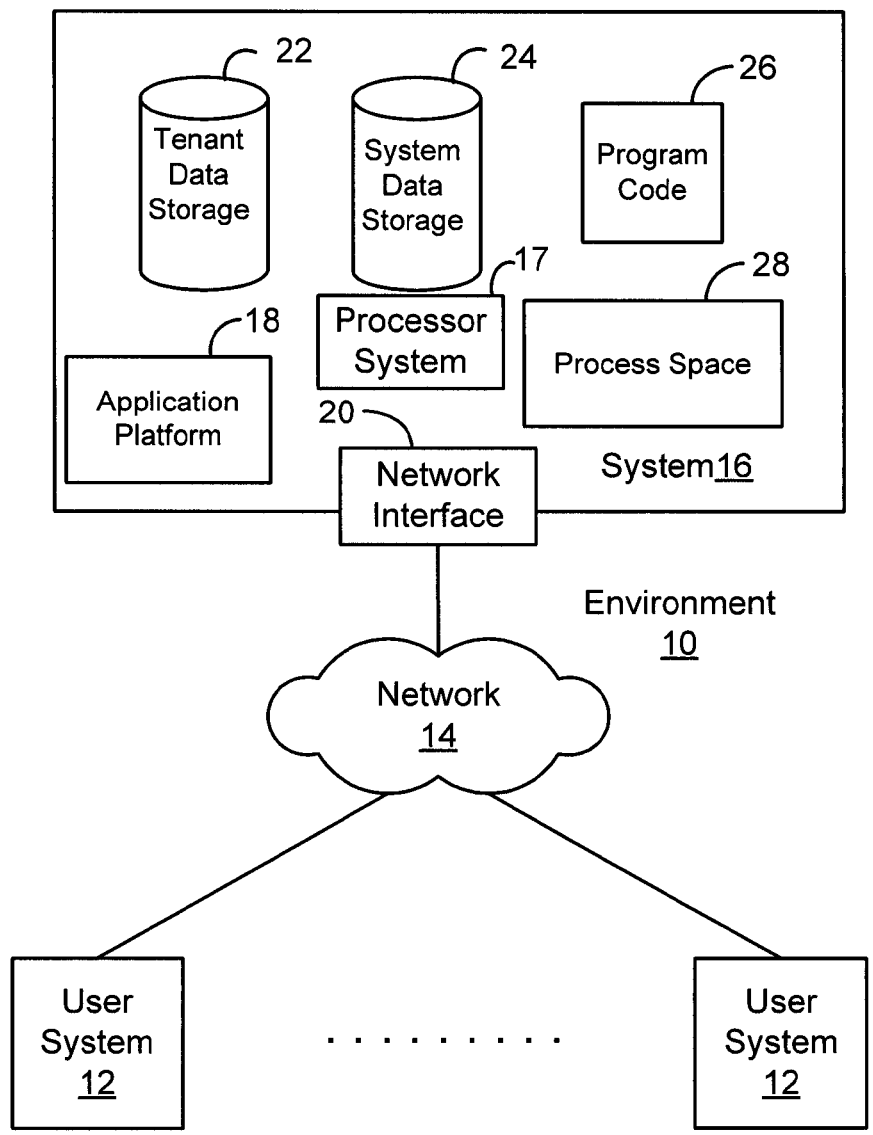
FIG. 1 illustrates a block diagram of an example of an environment wherein an on-demand database service might be used.

As used herein, the term "multi-tenant database system" refers to those systems in which various elements of hardware and software of the database system may be shared by one or more customers. For example, a given application server may simultaneously process requests for a great number of customers, and a given database table may store rows for a potentially much greater number of customers. As used herein, the term "query plan" refers to a set of steps used to access information in a database system.

As used herein, the term "user's profile" includes data about the user of the database system. The data can include general information, such as title, phone number, a photo, a biographical summary, and a status (e.g., text describing what the user is currently doing). As mentioned below, the data can include messages created by other users. Where there are multiple tenants, a user is typically associated with a particular tenant. For example, a user could be a salesperson of a company that is a tenant of the database system that provides a database service.

As used herein, the term "record" refers to an instance of a data object created by a user of the database service, for example, about a particular (actual or potential) business relationship or project. The data object can have a data structure defined by the database service (a standard object) or defined by a subscriber (custom object). For example, a record can be for a business partner or potential business partner (e.g. a client, vendor, distributor, etc.) of the user, and can include an entire company, subsidiaries, or contacts at the company. As another example, a record can be a project that the user is working on, such as an opportunity (e.g. a possible sale) with an existing partner, or a project that the user is trying to get. In one embodiment implementing a multi-tenant database, all of the records for the tenants have an identifier stored in a common table. A record has data fields that are defined by the structure of the object (e.g. fields of certain data types and purposes). A record can also have custom fields defined by a user. A field can be another record or can include links thereto, thereby providing a parent-child relationship between the records.

As used herein, the term "feed" includes a combination (e.g. a list) of feed items. As user herein, the term "feed item" (or feed element) refers to information about a user ("profile feed") of the database or about a record ("record feed") in the database. A user following the user or record can receive the associated feed items. The feed items from all of the followed users and records can be combined into a single feed for the user.

As examples, a "feed item" can be a message and story (also called a feed tracked change). A feed can be a combination of messages and stories. Messages include text created by a user, and may include other data as well. Examples of messages include posts, status updates, and comments. Messages can be created for a user's profile or for a record. Posts can be created by various users, potentially any user, although some restrictions can be applied. As an example, posts can be made to a wall section of a user's profile (which can include a number of recent posts) or a section of a record that includes multiple posts. The posts can be organized in chronological order. In contrast to a post, a status update changes a status of a user and is made by that user. Other similar sections of a user's profile can also include an "About" section. A record can also have a status, whose update can be restricted to the owner of the record. The owner can be a single user, multiple users, or a group. In one embodiment, there is only one status for a record. In one embodiment, a comment can be made on any feed item. In another embodiment, comments are organized as a list explicitly tied to a particular story, post, or status update. In this embodiment, comments may not be listed in the first layer (in a hierarchal sense) of feed items, but listed as a second layer branching from a particular first layer feed item.

A "story" is data representing an event, and can include text generated by the database system in response to the event. In one embodiment, the data can initially be stored, and then the database system can later use the data to create text for describing the event. Both the data and/or the text can be a story, as used herein. In various embodiments, an event can be an update of a record and/or can be triggered by a specific action by a user. Which actions trigger an event can be configurable. Which events have stories created and which stories are sent to which users can also be configurable. Messages and stories can be stored as a field or child object of the record. For example, the feed can be stored as a child object of the record.

As used herein, a "group" is a collection of users. In some aspects, the group may be defined as users with a same or similar attribute, or by membership. In one embodiment, a "group feed" includes any feed item about any user in a group. In another embodiment, a "group feed" includes feed items that are about the group as a whole. In one implementation, the feed items for a group are only posts and comments.

As used herein, an "entity feed" or "record feed" refers to a feed of feed items about a particular record in the database, such as stories about changes to the record and posts made by users about the record. An entity feed can be composed of any type of feed item. Such a feed can be displayed on a page (e.g. a web page) associated with the record (e.g. a home page of the record). As used herein, a "profile feed" is a feed of feed items about a particular user. In one embodiment, the feed items for a profile feed are posts and comments that other users make about or send to the particular user, and status updates made by the user. Such a profile feed can be displayed on a page associated with the particular user. In another embodiment, feed items in a profile feed could include posts made by the particular user and feed tracked changes (stories) initiated based on actions of the particular user.

DETAILED DESCRIPTION

I. General Overview

Systems and methods are provided for optimizing data synchronization between mobile clients and database systems. As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers.

Mechanisms and methods for providing systems and methods for optimization techniques for accessing business data will be described with reference to example embodiments. First, a "Systems Overview" is provided illustrating an environment where an on-demand database service might be used. It is followed by a section on "Data Synchronization Systems Overview", a section on "Performance Optimization based on Query breakdown and Partial results", a section on "Performance Optimization based on client type", and a section on "Performance Optimization based on intelligent pre-caching of user data".

II. System Overview

FIG. 1 illustrates a block diagram of an environment 10 wherein an on-demand database service might be used. Environment 10 may include user systems 12, network 14, system 16, processor system 17, application platform 18, network interface 20, tenant data storage 22, system data storage 24, program code 26, and process space 28. In other embodiments, environment 10 may not have all of the components listed and/or may have other elements instead of, or in addition to, those listed above.

Environment 10 is an environment in which an on-demand database service exists. User system 12 may be any machine or system that is used by a user to access a database user system. For example, any of user systems 12 can be a handheld computing device, a mobile phone, a laptop computer, a work station, and/or a network of computing devices. As illustrated in FIG. 1 (and in more detail in FIG. 2) user systems 12 might interact via a network 14 with an on-demand database service, which is system 16.

An on-demand database service, such as system 16, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 16" and "system 16" will be used interchangeably herein. A database image may include one or more database objects. A relational database management system (RDMS) or the equivalent may execute storage and retrieval of information against the database object(s). Application platform 18 may be a framework that allows the applications of system 16 to run, such as the hardware and/or software, e.g., the operating system. In an embodiment, on-demand database service 16 may include an application platform 18 that enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, where a salesperson is using a particular user system 12 to interact with system 16, that user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP messages to and from an HTTP server at system 16. Such an HTTP server might be implemented as the sole network interface between system 16 and network 14, but other techniques might be used as well or instead. In some implementations, the interface between system 16 and network 14 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 16, shown in FIG. 1, implements a web-based customer relationship management (CRM) system. For example, in one embodiment, system 16 includes application servers configured to implement and execute CRM software applications as well as provide related data, code, forms, webpages and other information to and from user systems 12 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

One arrangement for elements of system 16 is shown in FIG. 1, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 1 include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 16 or other systems or servers. For example, the user interface device can be used to access data and applications hosted by system 16, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 12 and all of its components are operator configurable using applications, such as a browser, including computer code run using a central processing unit such as an Intel Pentium® processor or the like. Similarly, system 16 (and additional instances of an MTS, where more than one is present) and all of their components might be operator configurable using application(s) including computer code to run using a central processing unit such as processor system 17, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 16 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 16 is configured to provide webpages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 2:
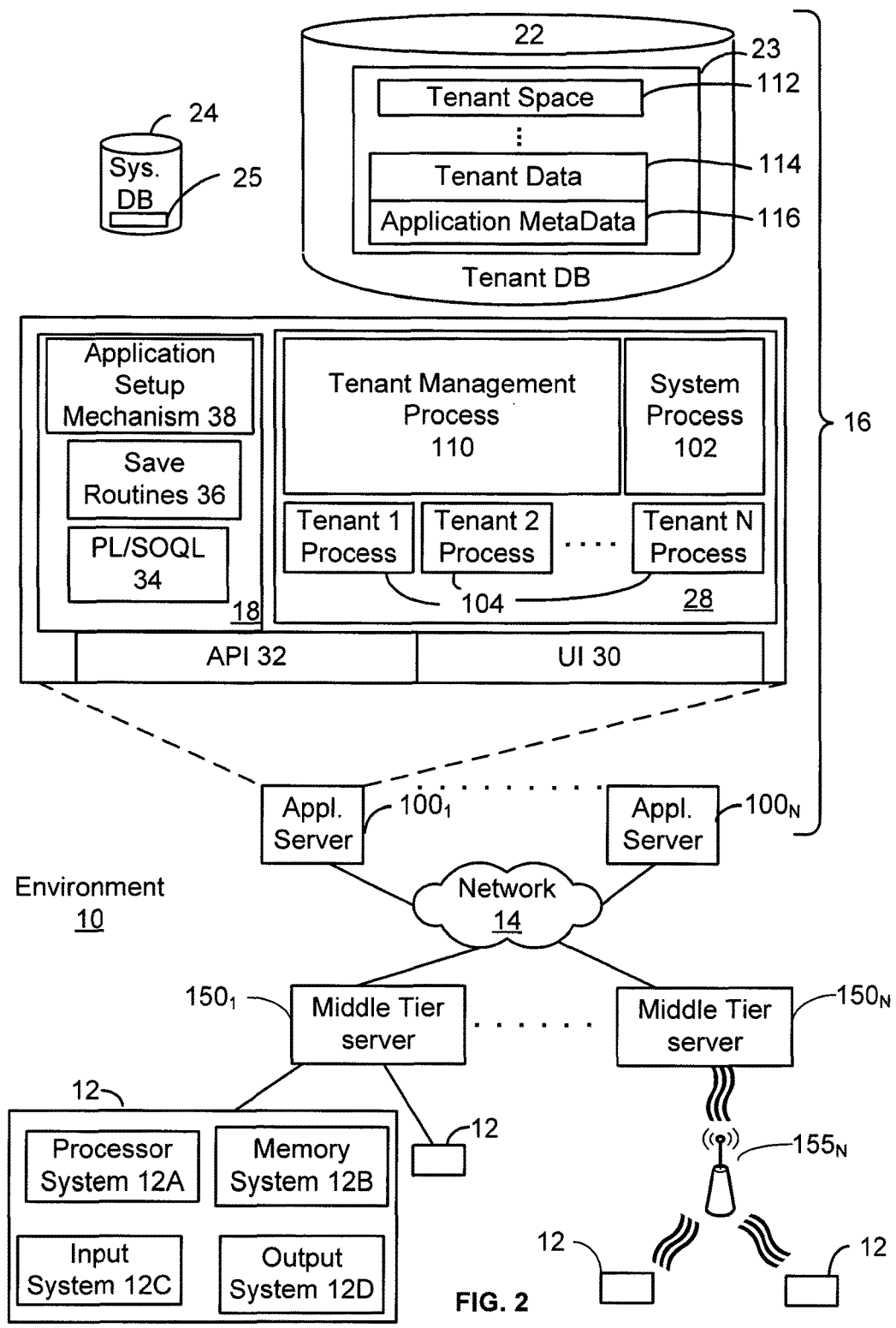
FIG. 2 illustrates a block diagram of an embodiment of elements of FIG. 1 and various possible interconnections between these elements.

FIG. 2 illustrates a block diagram of an embodiment of elements and various possible interconnections between these elements. In the embodiment illustrated by FIG. 2, one or more middle tier servers 150 exist between system 16 and user systems 12. Middle tier servers 150 are termed middle tier because these servers are interposed between the system 16 and the user systems of a particular organization. As described above, network 14 may be used for communication between system 16 and system 12. In one embodiment, the same network 14 is used between a middle tier servers 150 and user systems 12. In another embodiment, a different network is used between a middle tier server 150 and user systems 12. For example, a tenant network $155_N$ may be a wireless network, and network 14 may provide communicable coupling via fiber-optics. Each network 14 or tenant network $155_N$ may also be a combination of different types and protocols.

In one embodiment, each middle tier server 150 manages data of a different organization or tenant, however other embodiments may include information of more than one tenant coupled to a single middle tier server. In another embodiment, each middle tier server 150 may contain a plurality of servers, which collectively provide communication between system 16 and user systems 12 of an organization. The tenant network 155 of each organization may be of a different type (e.g. wireless, optical, . . . ) or protocol. Examples of wireless protocols include Wireless LAN, Global System for Mobile Communications (GSM), Personal Communications Service (PCS), D-AMPS, Wi-Fi, General Packet Radio Service (GPRS), 3G wireless systems such as those using Code division multiple access (CDMA), HIgh PErformance Radio LAN (HIPERLAN), and Worldwide Interoperability for Microwave Access (WiMAX).

Additionally, FIG. 2 further illustrates elements of system 16 and various interconnections. FIG. 2 shows that user system 12 may include processor system 12A, memory system 12B, input system 12C, and output system 12D. As shown in FIG. 2, network 14 couples user systems 12 and system 16. FIG. 2 also shows that system 16 may include tenant data storage 22, tenant data 23, system data storage 24, system data 25, User Interface (UI) 30, Application Program Interface (API) 32, PL/SOQL 34, save routines 36, application setup mechanism 38, applications servers $100_1$-$100_N$, system process space 102, tenant process spaces 104, tenant management process space 110, tenant storage area 112, user storage 114, and application metadata 116. In other embodiments, environment 10 may not have the same elements as those listed above and/or may have other elements instead of, or in addition to, those listed above.

Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 2, system 16 may include a network interface 20 (of FIG. 1) implemented as a set of HTTP application servers 100, an application platform 18, tenant data storage 22, and system data storage 24. Also shown is system process space 102, including individual tenant process spaces 104 and a tenant management process space 110. Each application server 100 may be configured to tenant data storage 22 and the tenant data 23 therein, and system data storage 24 and the system data 25 therein to serve requests of user systems 12. The tenant data 23 might be divided into individual tenant storage areas 112, which can be either a physical arrangement and/or a logical arrangement of data. Within each tenant storage area 112, user storage 114 and application metadata 116 might be similarly allocated for each user. For example, a copy of a user's most recently used (MRU) items might be stored to user storage 114. Similarly, a copy of MRU items for an entire organization that is a tenant might be stored to tenant storage area 112. A UI 30 provides a user interface and an API 32 provides an application programmer interface to system 16 resident processes to users and/or developers at user systems 12. The tenant data and the system data may be stored in various databases, such as one or more Oracle™ databases.

Application platform 18 includes an application setup mechanism 38 that supports application developers' creation and management of applications, which may be saved as metadata into tenant data storage 22 by save routines 36 for execution by subscribers as one or more tenant process spaces 104 managed by tenant management process 110 for example. Invocations to such applications may be coded using PL/SOQL 34 that provides a programming language style interface extension to API 32. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving application metadata 116 for the subscriber making the invocation and executing the metadata as an application in a virtual machine.

Each application server 100 may be communicably coupled to database systems, e.g., having access to system data 25 and tenant data 23, via a different network connection. For example, one application server $100_1$ might be coupled via the network 14 (e.g., the Internet), another application server $100_{N-1}$ might be coupled via a direct network link, and another application server $100_N$ might be coupled by yet a different network connection. Transfer Control Protocol and Internet Protocol (TCP/IP) are typical protocols for communicating between application servers 100 and the database system. However, it will be apparent to one skilled in the art that other transport protocols may be used to optimize the system depending on the network interconnect used.

In certain embodiments, each application server 100 is configured to handle requests for any user associated with any organization that is a tenant. Because it is desirable to be able to add and remove application servers from the server pool at any time for any reason, there is preferably no server affinity for a user and/or organization to a specific application server 100. In one embodiment, therefore, an interface system implementing a load balancing function (e.g., an F5 Big-IP load balancer) is communicably coupled between the application servers 100 and the user systems 12 to distribute requests to the application servers 100. In one embodiment, the load balancer uses a least connections algorithm to route user requests to the application servers 100. Other examples of load balancing algorithms, such as round robin and observed response time, also can be used. For example, in certain embodiments, three consecutive requests from the same user could hit three different application servers 100, and three requests from different users could hit the same application server 100. In this manner, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain embodiments, user systems 12 (which may be client systems) and/or middle tier servers 150 communicate with application servers 100 to request and update system-level and tenant-level data from system 16 that may require sending one or more queries to tenant data storage 22 and/or system data storage 24. System 16 (e.g., an application server 100 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

III. Data Synchronization Systems Overview

Users of database systems 16 of FIG. 2 often require synchronizing (also called syncing) of data between the client and database system 16, which stores data of interest to the user. Such data syncs are often bi-directional; so user updates on the client machine are forwarded to the database for persistence and updates on a database system (e.g. updates by other users, by the current user at another time, or other systems, etc.) may need to be synced back to the client machine. In some embodiments, data between a user and database system can be synced in full sync or incremental sync modes. In full sync, all data that a user may be interested in would be retrieved from one or more database systems and provided to the client. In incremental mode, only data changes that are delta changes from the last time a client synced data will be forwarded to a user or client machine. Synchronizing data can include all data changes, such as updates, deletions, new items or additions, etc.

User data can be synced in real-time with every update or at certain polling intervals. A full sync may only need to be performed daily, at the start of a user's sessions for the day. While incremental syncs may be performed at a specific time interval, e.g., every twenty minutes. Sometimes, the polling interval can take the user's activity into account for syncing data, e.g., sync only every forty minutes where a user has little or no activity for a certain amount of time. In some aspects, it may be advantageous to sync data to a client when the client submits an update (e.g. upon a user updating data on a client machine), since it is already communicating with the underlying database resources.

The type of data that a client may be interested in syncing can include feed items, opportunity data, sales information, organization data, user data, etc. The data may differ in the rate of changes. For example, organization or user data may not be subject to frequent changes (i.e. because such information is usually relatively static). On the other hand, feed items may change often and a user may require syncing such data more often due to its frequency in updates or new submissions or due to its higher importance in being communicated to a user in more near real-time. Such data is described in more details in Lee, incorporated herein by reference.

Figure 3:
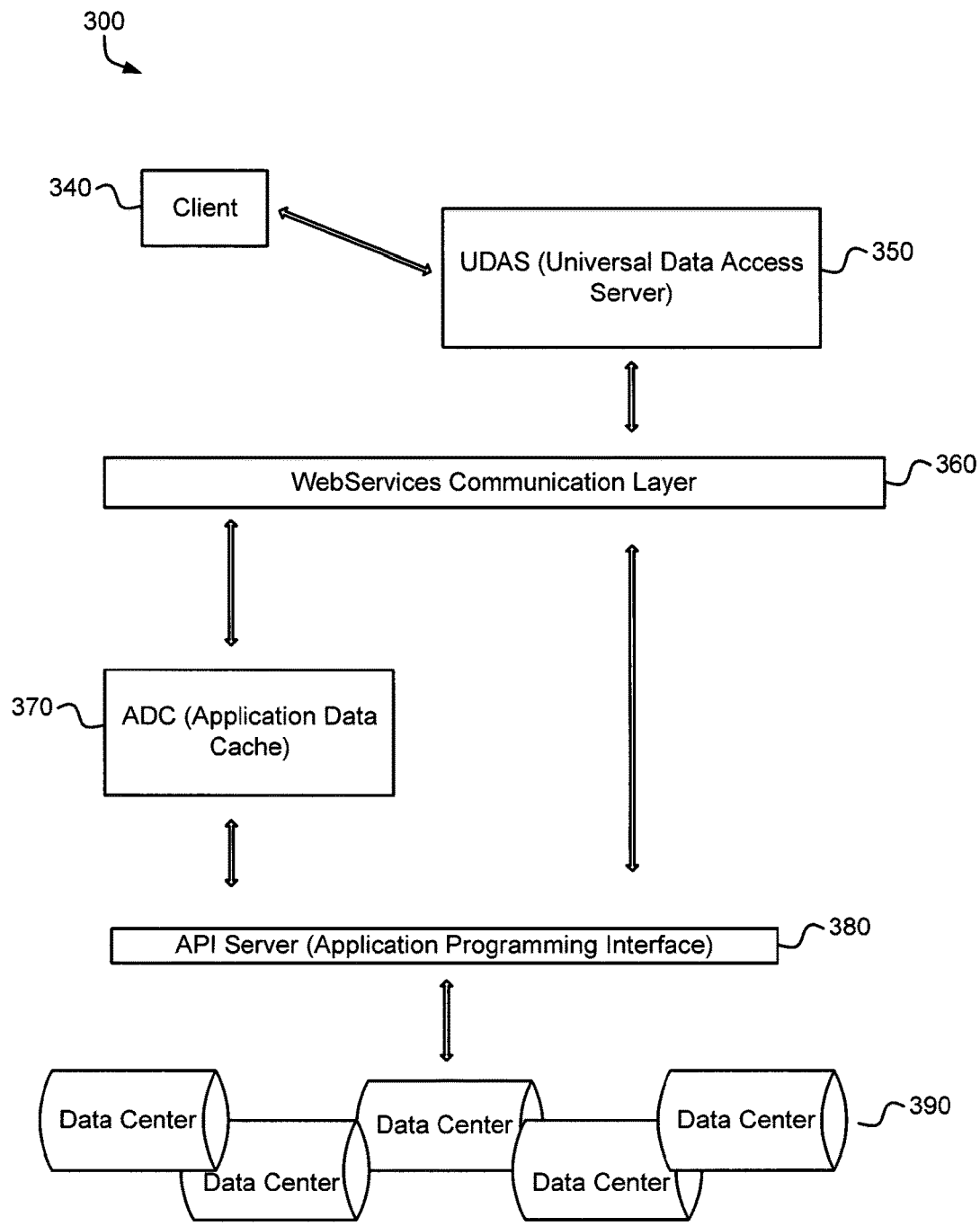
FIG. 3 illustrates a block diagram of system components for synchronizing data between clients and a database system according to embodiments of the present invention.

FIG. 3 shows components that can facilitate data synchronization between a client (e.g., user system 12 of FIG. 1), and a database system (e.g., database system 16) according to embodiments of the present invention. A client 340 may send a data sync request to a Universal Data Access Server (UDAS) 350. Then, the UDAS 350 may communicate with an Application Data Cache (ADC) 370, e.g., using a Web Service communication layer 360. The ADC 370 may communicate with a data center 390, via an Application Programming Interface server (API Server) 380, in order to synchronize data between client 340 and data center 390. Alternatively, a UDAS 350 may communicate directly with an API Server 380 to retrieve or update data center 390 data, bypassing ADC 370. A direct communication from UDAS 350 to data center 390, via the API server 380, is sometimes more efficient then requesting data from ADC 370.

UDAS 350 may be a universal data access server (i.e., providing a standardized communication transport layer) that supports communications/requests from clients of the various types described for user system 12. It can maintain delta changes between a client 340 that it serves and the corresponding data center 390. More details on delta changes are described in the companion application Weissman. UDAS 350 may maintain delta changes for performance enhancements, thereby allowing the communication of only data that a client does not have a recent copy. In one embodiment, UDAS 350 may communicate data changes bi-directionally, applying updates from a client 340 to the underlying data center 390 and supplying client 340 with updates from data center 390. UDAS 350, coupled with ADC 370 may serve the mobile clients community in retrieving and updating data between data center 390 and clients 340. UDAS 350 may communicate directly with data center 390, with or without an API server 380. The UDAS 350 may instead communicate with other middle-tier components, such as ADC 370.

Web Services communication layer 360 may exist to standardize communications between web and mobile clients and data center 390 servers. Client devices and/or applications may use WSC 360 (e.g., indirectly via UDAS) to interact with ADC 370 and other application programming interface components (e.g. API server 380). ADC 370 and/or other application programming interface components are exposed via WSC 360, e.g., in order for external devices such as client devices and/or applications to communicate with ADC 370 and/or other application programming interface components.

ADC 370 may serve as a data cache sitting between database systems, such as data center 390 and client interfacing components, such as UDAS 350. ADC 370 may be maintained for performance improvements such as pre-executing a query on behalf of a client 340, thereby requiring only forwarding of such data upon a request from UDAS 350 on behalf of the client. It may be a simple cache, merely querying the data center 390 and holding data for a client 300 to request. On the other hand ADC 370 may implement logic to either manipulate retrieved data for business logic or for optimizing the data storage and subsequent delivery to a client for performance reasons. ADC 370 may communicate with data center 390 via the API Server 380 or directly with data center 390.

API Server 380 may facilitate all direct communications with the data servers of data center 390. This layer may help with standardizing communications with the servers of data center 390, from all middle-tier components (e.g., UDAS 350, ADC 370, etc.) and/or external clients. API 380 layer may provide an application programming interface to data bases and or other services components (e.g., external applications and/or internal components may use API 380 layer to interact with databases and other server-side components). For example, UDAS 350 may use API 380 to access data center 390 and various other services. The databases and/or other services may be located at different data centers.

Components described for FIG. 3 may exist as a single computer or on a host of machines. They may exist for an individual component or may be shared for one or more components. They may be configured with various operating systems and may run various types of software, written in a host of programming languages. Data center 390 may implement any database system that facilitates the storing, updating, retrieval of data that clients 340 may be interested in.

IV. Performance Optimization Based on Query Breakdown and Partial Results

In some instances, there has been a perceived performance problem in response times to an incremental or full synchronization request sent by mobile clients. One contributing cause to this observation can be that the Mobile Servers (e.g., UDAS and ADC) may perform all required sync requests, schema updates, photo retrievals and spidering as a complete atomic, undivided operation where the client has no choice but to wait for the completion of the entire sync request.

For example, when a client requests updates/syncs from data server (e.g., UDAS component 350 of FIG. 3), it may forward the request to a caching component (e.g., ADC component 370 of FIG. 3) for retrieving data for synchronization with client machine. ADC updates are usually done at a polling interval that is not in near real-time. For example, it may update the data once a day to sync the entire data set for a user, e.g., upon a user logging on in the morning. For news feeds items, the data may need to be synced in more near real-time to be of value to a user.

However, because the ADC gets all user data updates (not just news feeds), the ADC syncing logic is very computationally expensive and cannot be performed more regularly, in near real-time. Thus, it is sometimes not efficient to use the ADC to get feed items types of updates, requiring more frequent near real-time retrieval.

Accordingly, one embodiment breaks up a server processing request into smaller, faster pieces and sends several pipe-lined responses to the client, so clients can present updated data to the user as soon as it is available. The request may be broken up based on types of data (e.g., feed items vs. all other user data). It may be broken up by size (e.g., retrieve the first 100 and then retrieve the next 500, etc.). The request can be broken up by any other reasonable criteria that would benefit the requesting user (e.g., retrieve all data in chunks by different clients or opportunities or organizations, etc.). Such a process can improve the perceived performance.

According to one embodiment, the request is broken up into two or more requests. In one aspect, the request is broken up to retrieve different types of data sets. For example, a sync request may be broken into two requests, one for feed items and another for all other user data. This may be done because feed items require a more near real-time synchronization (i.e., because the information changes more frequently or because it is important and needs to be delivered to the user in near real-time).

In some aspects, the separate broken down requests may be fulfilled with different component and/or code paths. For example, the feed items may be retrieved directly from a database system, while all other data may be retrieved from a cache. In some embodiments, such a mode of operation may only be active where the client has indicated support for it by sending a flag (e.g., CLIENT_CHATTER_SYNC option). An older client may synchronize data as implemented before the optimizations, for purposes of code compatibility. Depending on the flag, the system may retrieve feed items from the database system (e.g., data center 390 of FIG. 3), via an API layer (e.g, component 380 of FIG. 3), sometimes in addition to data retrieved from a cache (ADC 370 of FIG. 3).

In another aspect, the sync request may be broken up into several smaller requests based on a criteria other than types of data (e.g., size of result set, the first being 500 rows and the next being the remaining rows). Each smaller request then may be submitted either to the ADC or directly to an API server. The returned or retrieved result set can then be sent to the requesting client as the partial results are obtained by the UDAS. This can help, for example when a large data set is to be sent over to the user.

Figure 4:
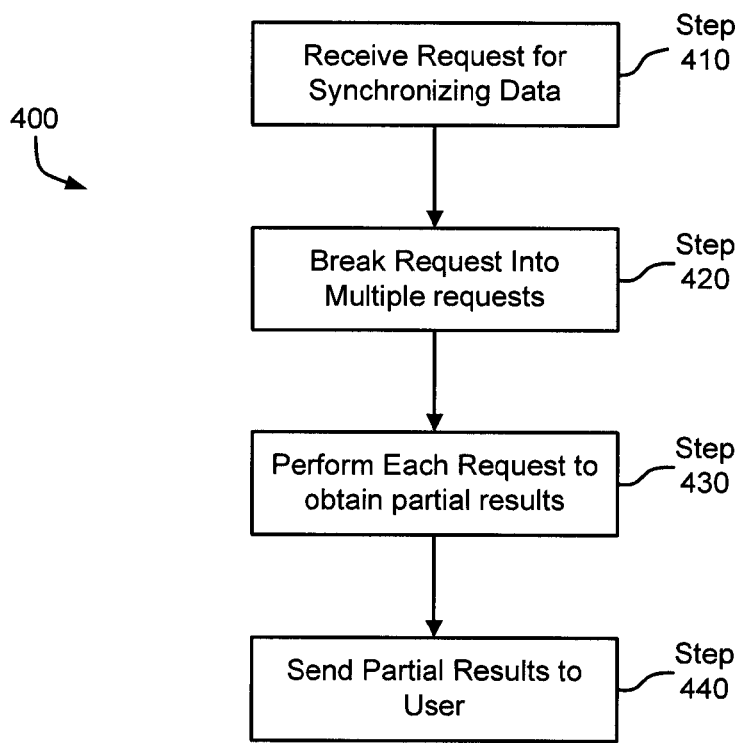
FIG. 4 is a flowchart illustrating a method of optimizing data synchronization by breaking a request into multiple requests according to embodiments of the present invention.

FIG. 4 is a flowchart of a method 400 for optimizing data synchronization by breaking requests into multiple requests according to embodiments of the present invention. At step 410 a request for synchronizing data is received. For example, a mobile client may need to update her user data since the last time she was online. The synchronization request may also be sent by an active client, for example, at every 20 minutes polling interval. In one aspect, the request is associated with a plurality of different types of data stored in a database system (e.g., feed items, organization data, user data, opportunity records, etc.)

At step 420 the request is broken down into multiple requests. For example, it may be broken into two requests, one for feed items and another for all other data (i.e., because feed items change more frequently and need to be synced in more near real-time). The request may be broken down based on other criteria such as requests per sales opportunity, per organization, etc.

At step 430, partial results are obtained for the separate queries. In one aspect, the separate results are obtained at different times, where at least one of the partial results is received in near real-time for a type of dataset that requires faster response times to be synced with the requesting client. The partial results may be obtained from different system components or code paths. For example, one query for feed items may be submitted directly to a database server API, while the other query for all other dataset may be submitted separately to a middle-tier cache such as the ADC. Finally, the partial results, as they are obtained are sent over to the client at step 440.

In some aspects, chatter data (i.e. feed items) can be considered the most important data for the client UI, e.g., if one assumes the user will spend most of their time in those pages. In one aspect, the embodiment can make it possible to send feed updates very quickly (i.e., because they are handled with higher priority by sending a request only for that type of data, for example directly to an API server to retrieve items from the database system) to the client, while any remaining data may be retrieved and sent at a later point. For example, a full feed sync can take between 0.8 and 1.2 seconds using the API for a complex and large organization. Considering that, a goal may be to be able to return initial data to the client reliably in the sub-5 second range (assuming a good wireless connection).

Figure 5:
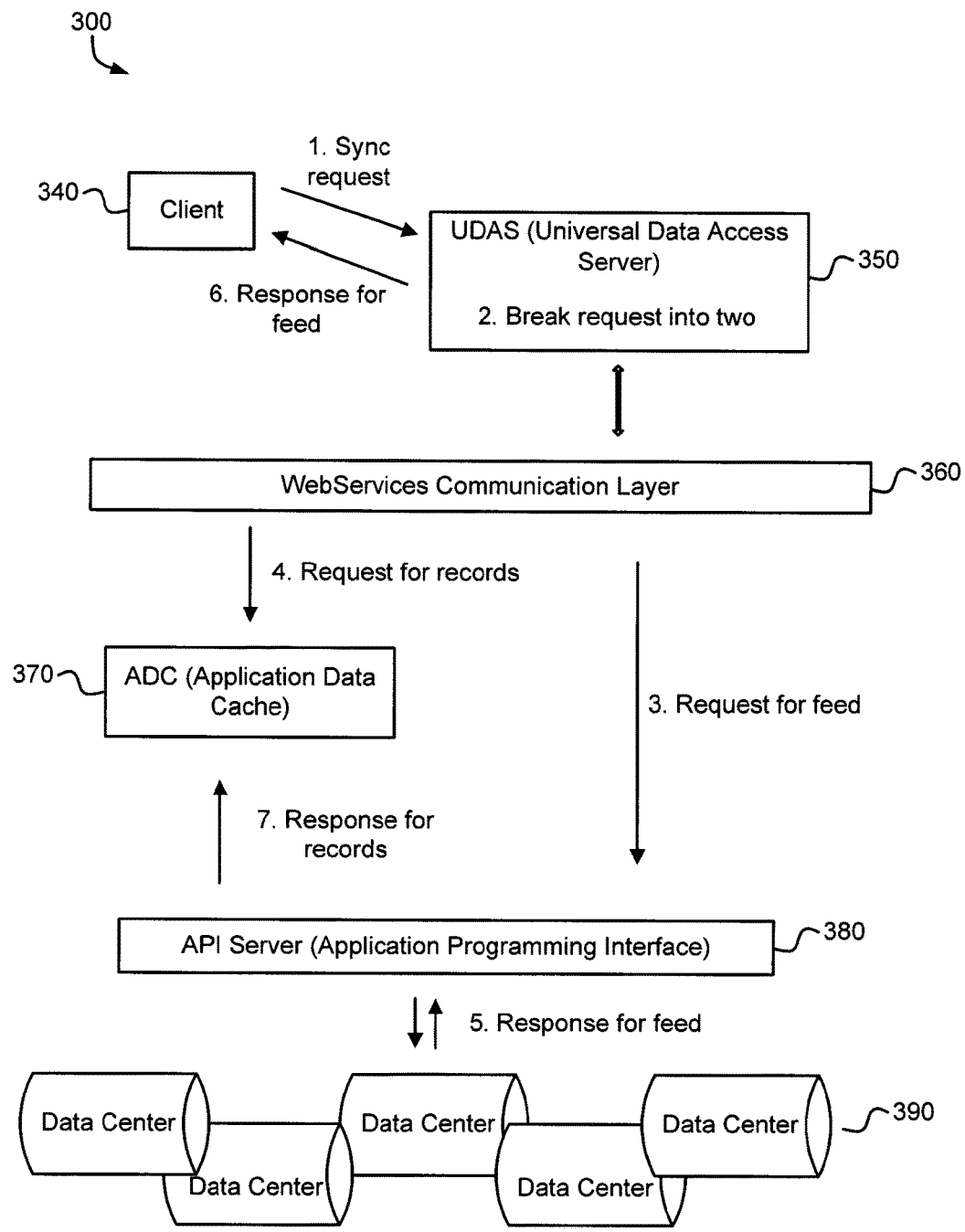
FIG. 5 illustrates the steps and corresponding components for optimizing data synchronization by breaking a client request into multiple requests.

FIG. 5 illustrates the steps of method 400 interacting with various system components for synchronizing user data according to one embodiment. At step 1, a client 340 sends a synchronization request to a UDAS system component 350. At step 2, the UDAS 350 breaks down the request into two requests (e.g. one for feed data and another for all other types of data). The UDAS 350 then sends the request for feed item updates to the API Server 380 at step 3. Feed items may be requested with a higher priority because such data needs to be synchronized more frequently. The data center 390 then receives the feed items update request and replies to the UDAS at step 5. At step 6 the feed data is sent to the requesting client 340.

UDAS 350 also sends a request for all other data updates at step 4 to ADC component 370. Such data may then need to be retrieved from the data center 390 via the API server 380. The data is then sent to the ADC 370 from data center 390 at step 7. Such a dataset will generally be larger then the feed data. Generally, such data is also more static then feed data and does not update as frequently.

In one embodiment, a mobile client may only request feed item updates, which then may be processed by the UDAS by retrieving the updated/new feed items directly from the API server. In such a case, the UDAS will not need to break up the request and submit one to the API server and the other to the ADC. Instead, the UDAS will recognize the data request as one that requires faster response times and request its updates from the faster path (e.g., directly from the database system, bypassing a caching server).

Example of Steps for an Incremental Sync Process

In one embodiment, when the client sends a run message requesting an incremental sync (which often is the most common client function) the following sequence of events will be processed by the Mobile server (UDAS). In step 1, a client acquires an API session, e.g., either from a session ID (SID) cache or by performing an authorization (e.g. using open authorization, OAuth) of the login. For a frequently used mobile client, one can hit the cache most of the time with zero overhead, but if the system does need to login, that might take some time. In one aspect, setting the SID timeout value to a longer value can be helpful for the overall mobile performance.

In step 2, a feed items only sync is performed, which will sync only feed items. In one aspect, this can be done outside the ADC. In one embodiment, Mobile Server (UDAS) invokes a standard query language (SOQL) query that may look like:

```
SELECT Id,ParentId,FeedPostId,Type,CreatedById,CreatedDate,
    SystemModstamp,Parent.Name,
    (SELECT Id,FeedItemId,FieldName,OldValue,NewValue FROM
    FeedTrackedChanges ), (SELECT Id,FeedItemId,ParentId,
CreatedById,CreatedDate,CommentBody FROM FeedComments ),
    FeedPost.Id,FeedPost.FeedItemId,FeedPost.ParentId,
    FeedPost.Type, FeedPost.Title,FeedPost.Body,
    FeedPost.LinkUrl,FeedPost.ContentFilename,
    FeedPost.ContentDescription,FeedPost.ContentType,
    FeedPost.ContentSize
    FROM NewsFeed ORDER BY SystemModstamp DESC LIMIT 100
```

The query can return the most recently active records from the user's feed items and all associated posts and comments.

In one embodiment, a result set limit can be provided by clients, rather than either hard-coded or administrator provided, to give users more flexibility for their own client devices. In another embodiment, there can be a limit on the number of feed comments. In yet other embodiments, a "Feeds=N" option can be added to a run message to indicate how many feed items should be synced. In one aspect, N can be between 1 and 1000, with a default value of 100.

In step 3, for mobile clients to be able to display nice looking feed records, the system may ensure that any of the created by reference fields can be resolved by the mobile client. In one aspect, this can also apply to parent IDs when the parent ID references a User record.

In one embodiment, as the UDAS already knows what user records already exists on a mobile device, the system can iterate over the records returned by the above feed items query and build a set of user IDs that the mobile device does not have. In many cases, that set may be empty and the system can skip the remainder of the steps. For the remaining user records, retrieve the associated user information using a SOQL query such as:

```
SELECT Id,FirstName,LastName,Name,<any other mandatory user
    fields>
    FROM User WHERE Id IN <set of user ids>
```

The returned user records from this query can then be merged with the records from the first feed items query.

In one embodiment, UDAS can perform a delta comparison between what already exists on a device and the set that should be there (e.g. from the result sets obtained from the above queries). This can result in a delta set of updates in the news feed, post, story, comment, and user tables on the device. In one implementation, at this time those changes can be submitted for delivery to the mobile clients. Assuming these updates are successfully delivered, the current state of device records can be set to the previous state plus updates in memory.

In step 4, each news feed can contain a parent id which can reference any feed-tracked object. If the entity type is mobilized (in the mobile configuration), it may be desirable that those records should also be included on the device. For example, this can be done by allowing ADC to spider those reference fields. In one implementation, any user references can be handled in step 3, and thus the system only need to pick any non-user references. A list of those references can be built.

In one embodiment, the ADC can be re-factored to accept an optional list of ID fields, that if present, will be treated as spiderable field references. In one implementation, having a maximum of 100 feed items will limit the list size to 100.

In some embodiments, UDAS can invoke a synchronize offline data API call (in incremental mode) and can pass the list of spiderable object references. ADC can then return any resulting changes. The ADC might also indicate that the configuration has been changed or indicate a lost state (which is rare) and if so, the ADC may return a complete dataset rather than incremental changes. In one embodiment, UDAS can handle such a scenario, by being able to rebuild the schema by calling describe mobile routine once and then be able to re-use the dataset returned in the original sync call.

In one embodiment, ADC can manage the syncing of entity subscription table, so updates to users subscriptions can appear at this time. The resulting changes can then be submitted for delivery to the client and the changes applied to the in-memory current state.

In step 5, at this time, an embodiment can then process actual photo image data. For any updated user records (related to the feed collection), the system can check if the system already has a photo for the user, if the system does, the system can check if it is the current version (based on photo version field). If the system does not have a photo of the right version and the user query above returned a valid version, the system can issue a sequence of HTTP GET operations to retrieve the actual image data, which will be added as a synthetic AXMPhoto field in user records and be sent to the mobile device as updates to user records. In another embodiment, it can be beneficial not to break out this step.

In step 6, the sync is considered to be completed and the system (server) can send a run message completion to the client.

Example of Steps for a Full Sync Process.

In one embodiment, a full sync process can be done. The same sequence of events, as for an incremental sync request, can be followed for a full sync with the exception that UDAS will invoke a synchronize offline data API call in full incremental mode. Additionally, a full sync can check all photo images for updates, not just those related to recent updates. In one implementation, a full sync can be done once every 24 hours.

Activation Process.

In one embodiment, the system will not perform any pipelining of data, sometimes by breaking the requests into multiple request, during the activation phase (e.g., a set up phase when client requests and receives schema information, such as structured metadata, that allows a client application to resolve data received from synchronization requests, and to build the user-interface representation). In once case, a client application must be "activated" before it can utilize pipelined data, e.g., data received as a result of a synchronization request. This embodiment may be done for the following circumstance. For example, clients may wait for the completion of an activation command before allowing user to interact with the application. A schema creation (a potentially slow process) can be done before any data can be sent.

V. Performance Optimization Based on Client Type

In some cases where a client communicates with a database system (e.g., for synchronization), there is a perceived performance problem because client device resources are not fully utilized. This may be because the code that implements synchronization logic for a client request for latest data updates does not take into account the client type (e.g. mobile vs. desktop clients, having different memory, disk space, screen space, and processing power). For example, all clients may get a static 5000 updates, even where the client can handle more updates, e.g., an outlook or desktop client may be able to handle up to 20,000 updates.

Accordingly, in one embodiment by refactoring such synchronization code to take into account client types, the code can be optimally used for varying client capacities. For example, a UDAS transport layer can detect the client type and forward that information with the sync request and the data set returned may then vary for different client types. This is advantageous because it allows for fully leveraging varying capacities of the devices that clients use. For example, a mobile client may not be able to gracefully handle a 20,000 row data set returned to it, perhaps because of limitations in memory, processing power, or screen space. On the other hand, a desktop client may want all 20,000 rows to be returned because the machine can handle it and it provides the complete data set for the client to consider.

Figure 6:
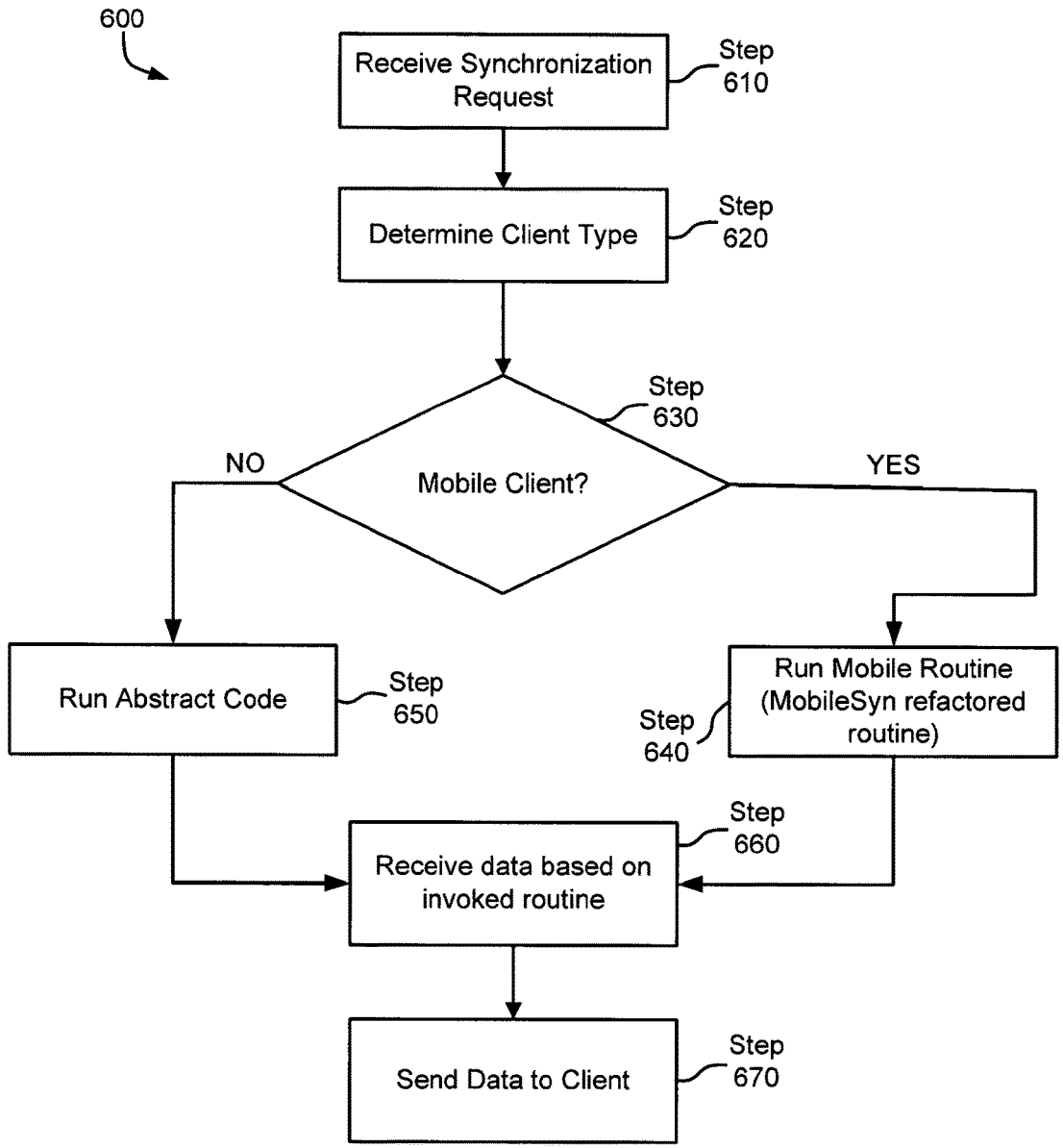
FIG. 6 is a flowchart of an embodiment of steps of optimizing data synchronization based on the requesting client type.
Figure 7:
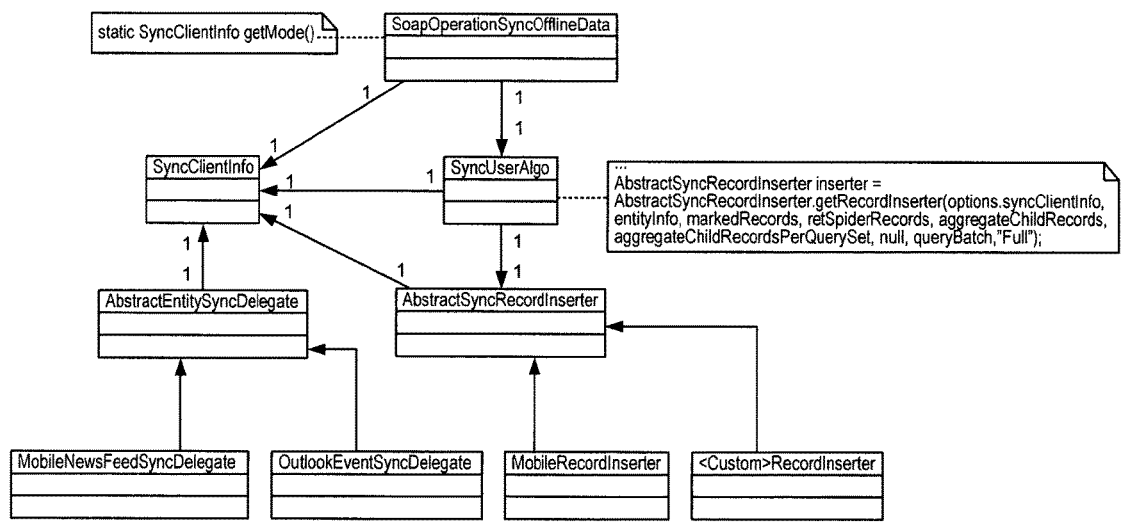
FIG. 7 is a schematic of new classes according to embodiments of the present invention.

FIG. 6 is a flowchart of a method 600 for optimizing data syncs based on the requesting client type. In step 610 a data synchronization request is received from a client to receive updates from a database. The request can be for full synchronization or incremental synchronization. The request can be for all data updates or feed items only or some other combination.

At step 620, the client type is determined (e.g. mobile client, desktop client, etc.). The determination of client type can be handled either by a UDAS server or by other components executing the request (e.g., an ADC or the API server). In the case for the client type determination is made by the executing components, the UDAS may supply information helpful for determining the client type to the executing components.

At step 630 a decision may be made to determine if it is a mobile client or not. The decision then may lead to execution of different codebase based on the client type. For example, if it is determined that the client is a mobile client then the mobile routine is executed at step 640, otherwise other code (e.g., the abstract class implementation) is executed as in step 650. In one embodiment, the UDAS may determine the client type at step 620 and then call a routine for the determined client type at step 630. In another embodiment, the information supplied by the UDAS may be used by the executing code to determine the client type, and thereby executing code for that client type. In either case, at step 660 data is retrieved based on the routine that is invoked and sent to the client at step 670.

Example of Routines/Code Specific to Client Types Using Abstract Classes

In various embodiments, classes can be abstracted to provide the high level functionality for synchronizing data across all client types (e.g. in an abstract class defining interfaces and common code). Individual implementations based on client types can exist in child classes that inherit from or extend the abstract classes. For example, for mobile client requesting feeds, the routine/code to get synchronization data may bypass the ADC cache and query the database directly. In another example, the result set may be set to a different size limit, depending on the client type, to handle the varying capacities of a client device. These are just a few examples and each individual implementation can provide client-type specific implementations.

In one embodiment, to achieve the goal of better flexibility in custom synchronization of data records, the system can implement logic that does not exist in the non-optimized code base. Such an improved code pattern may also provide better organization of the sync logic that is specific for a particular client type/entity, helping with code maintenance and development.

In the case of chatter objects synchronization, some difficulties can happen with using an ADC type of caching mechanism. In one case, syncing a news feed may not work well in incremental mode, then that object may always sync in the full mode. In another case, feed associates can only be queried using sub-queries, which may have no support for in the ADC query builder code. In yet another case, synching photos for chatter type of application is difficult with a current ADC implementation. The code refactoring as described below, which is customizable based on client type can help in tackling these issues by providing specific implementations.

In one embodiment, an abstract record inserter class is re-factored. FIG. 6 is a schematic representation of one such implementation. The new abstract class contains common high-level methods (i.e., code that would apply to all client types) and defines the interface for the custom implementations (i.e., code that applies specific to a client type).

In various embodiments, new classes can allow implementation of custom logic for possible direct communication between ADC and the database systems. In one embodiment, the methods for a mobile record inserter class may be moved to abstract record inserter, but the mobile record inserter may continue to provide methods that use query builder for mobile synchronization. Then custom record inserter classes can provide custom implementations based on other client types. In one iteration, the implementation may only read some records directly from the database and populate an application cursor server (ACS). An ACS may be an internal data store (e.g., file-based), that can be used by various components. For example, an ADC may use ACS stored data to keep track of records that clients are synchronizing and/or have synchronized (e.g., for caching).

A new abstract class can be added for entity sync delegation. It can then define the interface for methods specific for client-type/entity. For example, this class may contain methods to define query limits, and methods that can accommodate logic for building the associated queries in case of mobile/feed items type of data, and mandatory queries for outlook/events type of data. These custom implementations can be placed in classes for outlook event sync delegation and mobile news feed sync delegation. Some methods may also need to be migrated from current implementations of the sync client info class.

In one embodiment, soap operation sync offline data class can use the query/query more calls to return data. Due to that, there can be specialized retrieve functions to handle mobile data. This retrieve functionality can be moved into classes that implement the abstract sync record inserter logic so it can be overridden by custom inserter classes.

In another embodiment, for sync user algorithm class, the system can add a final pass to be run on all entities after spidering has been performed. This can allow for spidering additional data that depends on records that normally is only selected by the current spidering. An example of that can be for querying photos related to a users. In one aspect, the code for this can be in the abstract sync record inserter class (or its sub-classes).

VI. Performance Optimization Based on Intelligent Pre-Caching of User Data

To optimize performance, a system can anticipate data that a user would be interested in, such as updates to objects that are associated with a news feed item (new or updated). And based on that anticipation of a user request to update such items, the data for such objects can be pre-cached in, for example, the ADC for user retrieval. One example would be that it is likely that a user would be interested in the associated opportunities for which she is receiving news feed items. So, pre-caching opportunity data for the user can save time when the user subsequently requests such objects.

Accordingly, a method is provided for pre-caching synchronization data. The method comprises of receiving a synchronization request for items that a user is following, the items including feed items regarding a plurality of objects to which a user of a database system is subscribed. Then the one or more items that a user is following based on the request are retrieved. After the retrieval of items a use is following, they are analyzed to identify one or more objects related to the retrieved items. And, the one or more identified objects are retrieved prior to receiving, from the user, a request for the one or more identified objects and sent to a user-accessible cache.

For example, when a user received news feed updates, the underlying opportunity, the submitting user (of the news feed item), or the associated company object may be retrieved and pre-cached for the user. Such anticipatory pre-caching can save subsequent data retrieval time when the user wants to update or sync the underlying news feed data objects.

Figure 8:
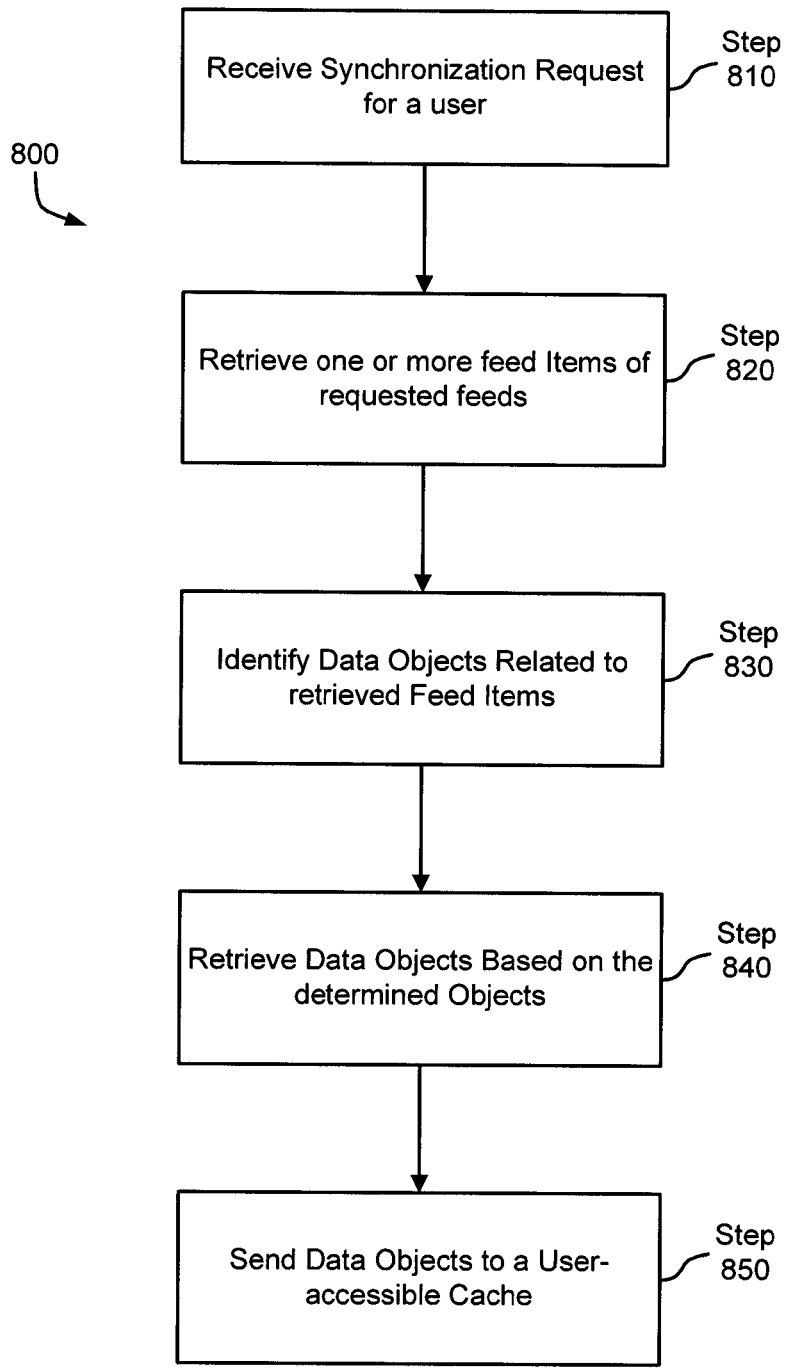

FIG. 8 is a flowchart of a method 800 for optimizing data syncs by pre-caching data that a user may later be interested according to embodiments of the present invention. Method 800 may be implemented using system 300, or other suitable systems. For example, the pre-caching can be performed for different client types.

In step 810, a synchronization request is received for one or more feeds of objects stored in a database system (e.g., system 16). In various embodiments, the request can be for the objects that a user is following (which may be for all or just a portion of the subscribed objects), or for a particular object (e.g., by a user selecting a particular record to view the feed of that record). Thus, the request could be for one feed, or for multiple feeds, each corresponding to a different object. In one aspect, each feed includes feed items that are each associated with one or more objects of the database system. For example, a feed item can be associated with a user that causes an event to occur (such as a post) and the object (e.g. a record) whose feed the post was added.

In one embodiment, the sync request can be received by a UDAS from a mobile client. In another embodiment, the sync request can be generated by the UDAS, any other intermediate server, or by the database. For example, a sync request can be generated periodically to automatically push new feed items to a client, which can include desktops as well as mobile clients.

At step 820, one or more feed items of the requested feeds are retrieved based on the request. In one aspect, the feed items may be retrieved from a cache. In another aspect, the feed items may be directly received from the database system. The feed items may be received at any component mentioned herein, e.g., an application server, a UDAS, an ADC, etc. The feed items that are retrieved can be all of the feed items for the requested feeds, or just some of them. For instance, only feed items that are newer than a specified date (which could be since a last request made for or by a particular user) might be retrieved.

At step 830 the retrieved feed items are analyzed to identify objects related to those feed items. Since these objects are related to feed items in the request, the user (e.g. the user of a client that initiates the request or who the request is made for) may be interested in viewing other information about these identified objects. In various embodiments, the retrieved feed items can be sent to a client, to a server in close proximity to the client.

As step 840, at least one of the identified objects is then retrieved from the database system. In various embodiments, all of the information of an object (e.g., a record or user profile) may be retrieved or only some of the information of an object. For example, one or more predetermined fields of an object could be retrieved. In one embodiment, the predetermined fields can include a field that was changed to create a story, a core set of fields (such as name, contacts, or amount, e.g., if the object is an opportunity), or ones that a user typically views. In one aspect, since an identified object is retrieved in response to an association to a feed item, the object can be retrieved prior to a request by the user.

In one embodiment, criteria can be applied as to which objects are retrieved, or if any objects are retrieved for a given synchronization request. In one implementation, an object is retrieved only if a feed item is new. In another implementation, an object is retrieved only if the new feed item is a story.

At step 850 the retrieved associated objects are sent to a user-accessible cache, in anticipation of the user later requesting their updates. The user-accessible cache can be located in various places. The cache can be in the client of the user. Thus, the object can be displayed and immediately be accessible to the user. The cache can be in a server either closely associated with the client device or in close proximity. For example, the cache could be a server associated with the organization of the user, or a proxy server that is geographically close to the client.

As one example, a synchronization request can be made for a news feed of a user. A server can send the request to a database to obtain the feed items for each of the objects that the user is following. The feed items can be analyzed to determine which objects are associated with the feed items. In one implementation, only new feed items (e.g., feed items newer than a specified date) are analyzed to determine objects that have recently changed or been talked about. These objects are ones that a user might likely want to view after the user reads the feed items that are associated with the objects. For example, a feed item might be a story that describes changes to a field of a record that the user is following. Thus, the user will likely want to view the record.

As another example, a user might actively request a feed of a particular record, For instance, a user could navigate to a detail page of the record and select to view the feed of the record. The feed items of that record can be analyzed, and objects associated with the feed items retrieved. In one implementation, only objects associated with recent feed items (e.g., 10 most recent feed items or feed items that are new since the user last received the feed of the record) are retrieved. For example, a user profile could be retrieved of a user who posted to the feed or caused a change in a field of a record.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

It should be understood that the present invention as described above can be implemented in the form of control logic using hardware and/or using computer software in a modular or integrated manner. Based on the disclosure and teachings provided herein, a person of ordinary skill in the art will know and appreciate other ways and/or methods to implement the present invention using hardware and a combination of hardware and software Any of the software components or functions described in this application may be implemented as software code to be executed by a processor using any suitable computer language such as, for example, Java, C++ or Perl using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer program product (e.g. a hard drive, a CD, or an entire computer system), and may be present on or within different computer program products within a system or network. A computer system may include a monitor, printer, or other suitable display for providing any of the results mentioned herein to a user.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

The invention claimed is:

1. A method of pre-caching synchronization data, the method comprising:
   receiving a synchronization request for one or more feeds of objects stored in a database system, the synchronization request associated with a user, each feed including feed items that are each associated with one or more objects of the database system;
   retrieving one or more feed items based on the synchronization request;
   analyzing the retrieved feed items to identify the one or more objects related to the retrieved feed items;
   retrieving at least one of the identified objects prior to receiving, from a client device, a request for the at least one identified object; and
   sending the retrieved objects to a user-accessible cache.

2. The method of claim 1, wherein retrieving at least one of the identified objects includes retrieving one or more predetermined fields of the object.

3. The method of claim 1, wherein the synchronization request is for feeds of one or more objects that the user is following.

4. The method of claim 3, wherein the synchronization request is for feeds of all of the objects that the user is following.

5. The method of claim 1, wherein the object is retrieved only if a feed item is new.

6. The method of claim 1, wherein the object is retrieved only if the new feed item is a story.

7. The method of claim 1, wherein the user-accessible cache is on the client device of the user.

8. The method of claim 1, further comprising:
   receiving, from the client device of the user, the request for the retrieved object; and
   sending the retrieved object from the user-accessible cache to a processor of the client device.

9. A system for pre-caching synchronization data, the system comprising:
   a processor-based application, which when executed on a computer, will cause a processor to:
      receive a synchronization request for one or more feeds of objects stored in a database system, the synchronization request associated with a user, each feed including feed items that are each associated with one or more objects of the database system;
      retrieve one or more feed items based on the synchronization request;
      analyze the retrieved feed items to identify the one or more objects related to the retrieved feed items;
      retrieve at least one of the identified objects prior to receiving, from a client device, a request for the at least one identified object; and
      send the retrieved objects to a user-accessible cache.

10. The system of claim 9, wherein retrieving at least one of the identified objects includes retrieving one or more predetermined fields of the object.

11. The system of claim 9, wherein the synchronization request is for feeds of one or more objects that the user is following.

12. The system of claim 11, wherein the synchronization request is for feeds of all of the objects that the user is following.

13. The system of claim 9, wherein the object is retrieved only if a feed item is new.

14. The system of claim 9, wherein the object is retrieved only if the new feed item is a story.

15. The system of claim 9, wherein the user-accessible cache is on the client device of the user.

16. The system of claim 9, wherein the processor-based application, when executed on a computer, will further cause the processor to:
   receive, from the client device of the user, the request for the retrieved object; and
   send the retrieved object from the user-accessible cache to a processor of the client device.

17. A computer program product comprising computer-readable program code to be executed by one or more processors when retrieved from a non-transitory computer-readable medium, the program code including instructions to:
   receive a synchronization request for one or more feeds of objects stored in a database system, the synchronization request associated with a user, each feed including feed items that are associated with one or more objects of the database system;
   retrieve one or more feed items based on the synchronization request;
   analyze the retrieved feed items to identify the one or more objects related to the retrieved feed items;
   retrieve at least one of the identified objects prior to receiving, from a client device, a request for the at least one identified object; and
   send the retrieved objects to a user-accessible cache.

18. The computer program product of claim 17 wherein retrieving at least one of the identified objects includes retrieving one or more predetermined fields of the object.

19. The computer program product of claim 17, wherein the synchronization request is for feeds of one or more objects that the user is following.

20. The computer program product of claim 19, wherein the synchronization request is for feeds of all of the objects that the user is following.

21. The computer program product of claim 17, wherein the object is retrieved only if a feed item is new.

22. The computer program product of claim 17, wherein the object is retrieved only if the new feed item is a story.

23. The computer program product of claim 17, wherein the user-accessible cache is on the client device of the user.

24. The computer program product of claim 17, wherein the program code includes further instructions to:
   receive, from the client device of the user, the request for the retrieved object; and
   send the retrieved object from the user-accessible cache to a processor of the client device.

* * * * *